Figure 1:
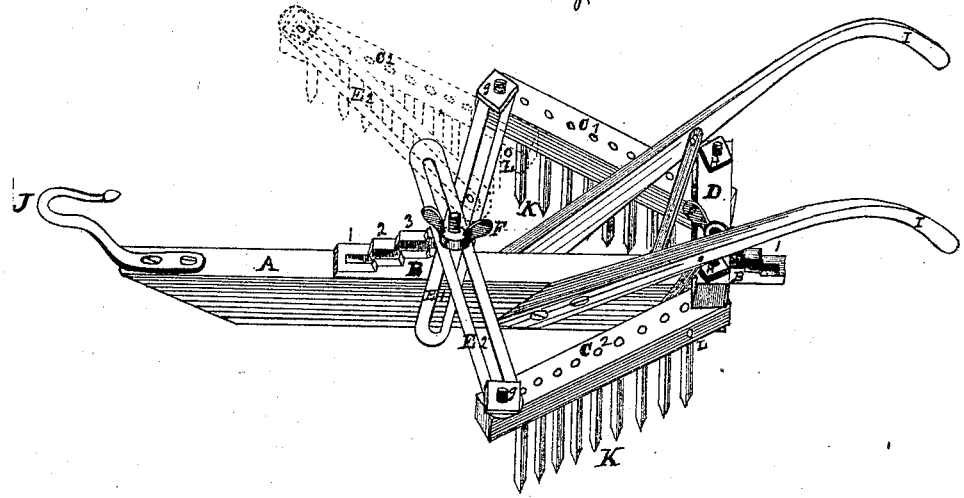

J. T. VAN WYCK.
Harrow.

No. 109,082.  Patented Nov. 8, 1870.

United States Patent Office.

JAMES T. VAN WYCK, OF POUGHKEEPSIE, NEW YORK.

Letters Patent No. 109,082, dated November 8, 1870.

IMPROVEMENT IN CULTIVATOR-RAKES.

The Schedule referred to in these Letters Patent and making part of the same.

*To all whom it may concern:*

Be it known that I, JAMES T. VAN WYCK, of the town of Poughkeepsie, in the county of Dutchess in the State of New York, have invented a new and improved Cultivator-Rake; and I do hereby declare that the following is a full and exact description thereof, reference being had to the accompanying drawing and to the letters of reference marked thereon.

The nature of my invention consists in attaching to either side or sides of a shoe-bar or runner suitable-shaped rakes, the rakes being so arranged as to rake a wide or narrow surface, and are adjustable, so that the teeth, when adjusted to rake light, cannot enter the ground beyond a certain required distance. They can also be lowered so as to enter the ground to any required depth, the whole being controlled and easily managed and guided by the shoe-bar and the handles attached thereto. The bar is drawn directly upon the ground, carrying the rakes upon it.

To enable others skilled in the art to make and use my invention, I will proceed to describe its construction and operation.

Figure 1 is a perspective view of my invention, showing all its parts.

Similar letters of reference indicate like parts.

A in the drawing represents the beam or shoe-bar, which I make of wood, and of the form shown.

This beam is the foundation upon which rests the graduated slide-rests B B.

These rests have steps, 1 2 3, formed upon them, as shown, the purpose of which is to allow the slide-braces $E^1$ $E^2$ to rest upon the steps so formed. By placing them at 1 they are brought near the bar. This serves to raise and lower the teeth of the rakes into or out of the ground.

The rake-heads $C^1$ $C^2$ are of wood, and in each is placed a suitable number of steel teeth.

One end of the rake-heads is attached to the cross-bar D with bolts, H, passing through the bar and rake-head, and secured by a nut, H.

The cross-bar D is secured to the runner-bar A with a bolt, upon which is a thumb-screw, F.

The braces $E^1$ $E^2$ are made with a slot, as shown, and are held fast by the bolts and screw F. By loosening the screw the forward end of the rake-heads can be spread outward, or they can be brought nearer together.

The graduated blocks B B have mortises in them, through which the bolt passes which holds them in place.

If it is desirable to have the rakes rake lightly in the ground, the blocks are placed, as shown, upon the upper step; but if it is desirable to rake deep in the ground, the blocks B can be moved to the step marked 1.

When it is desired, the rake $C^2$ can be unbolted, and both rakes can be attached together upon one side of the runner-bar. This is shown by the dotted lines.

The two rake-heads are fastened with a bolt, passing through the holes L L. The brace $E^2$ is bolted to the brace $E^1$, as seen by the dotted lines.

The whole implement is guided and controlled by the runner-bar A and handles I I.

Having described its construction, I will describe how it operates.

The horse is attached to the hook J, and the runner-bar is placed in a furrow already plowed. This furrow is nearly sufficient to guide the cultivator. As the ground is passed over, all the large lumps of dirt are caused to roll back into the furrrow and pass out at the rear end of the rake between the rake and the runner-bar, thus throwing them away from the plants, and leaving them in the furrows. This I consider an important feature of my invention.

When both rakes are placed upon one side of the runner-bar, it is so that they can be used to follow after a plow as the land is being plowed, so that the rakes operate only upon the ground that is plowed.

What I claim as my invention, and desire to secure by Letters Patent, is—

The runner-bar A, the blocks B B, rakes $C^1$ $C^2$, slide-braces $E^1$ $E^2$, when constructed, arranged, and combined to operate in the manner and for the purpose specified.

JAMES T. VAN WYCK.

Witnesses:
C. P. CARTER.
H. C. GRISWOLD.